F 96.24

United States Pa...... 3,739,095

Alden [45] June 12, 1973

[54] SCANNING APPARATUS

[75] Inventor: Milton Alden, Needham, Mass.

[73] Assignee: Alden Research Foundation, Brockton, Mass.

[22] Filed: Aug. 2, 1971

[21] Appl. No.: 168,406

Related U.S. Application Data

[63] Continuation of Ser. No. 765,949, Oct. 8, 1968, abandoned.

[52] U.S. Cl. 178/7.6, 178/6.6 R, 178/DIG. 2
[51] Int. Cl. H04n 1/24, H04n 3/02
[58] Field of Search 178/7.6, 6.6, DIG. 2; 250/227

[56] References Cited

UNITED STATES PATENTS

| | | | |
|---|---|---|---|
| 3,240,106 | 3/1966 | Hicks | 178/6 LC R |
| 3,279,460 | 10/1966 | Sheldon | 178/6 LC R |
| 3,318,996 | 5/1967 | Garfield | 178/6.6 |
| 3,064,077 | 11/1962 | Cary | 178/7.6 |
| 3,541,248 | 11/1970 | Young | 178/7.6 |

*Primary Examiner*—Robert L. Griffin
*Assistant Examiner*—Joseph A. Orsino, Jr.
*Attorney*—Norman S. Blodgett

[57] ABSTRACT

This invention relates to scanning apparatus and, more particularly, to equipment for reading visual material and converting it to an electrical signal representative of the visual image for retransmission to a recorder located at a remote location.

1 Claim, 2 Drawing Figures

INVENTOR.
MILTON ALDEN

BY
Morgan L. Blodgett
ATTORNEY

SCANNING APPARATUS

This application is a continuation of Ser. No. 765,949 filed Oct. 8, 1968, now abandoned.

BACKGROUND OF THE INVENTION

In the art of graphic communications, it has been common practice to provide a scanner for reading visual material and converting it to electrical pulses for transmission to a recorder where the visual image is reformed by the use of electro-sensitive paper. Such a scanner usually has a horizontal surface on which the copy is laid face down and a feed means to cause the copy to progress slowly over a reading slot. The reading slot not only provides illumination on the portion of the copy passing over it, but it also allows the image to appear for reading by optical equipment. The impression of the successive signals of a sweep-reading are impressed on a photocell for conversion to an electrical current representative of the image. Such scanning apparatus has been limited to reading copy which is small enough to lie on the horizontal surface and be moved over the slot by the feed apparatus. Furthermore, it has been practically impossible to transmit small selected portions of the copy because of the nature of the feeding and scanning apparatus. Attempts to provide small light portable scanners have been less than successful because the nature of the reading optics is such that the framework and supporting structure must be very rigid, thus militating against lightness and portability. These and other difficulties experienced with the prior art devices have been obviated ina novel manner by the present invention.

It is, therefore, an outstanding object of the invention to provide scanning apparatus having a portable and easily maneuverable reading head.

Another object of this invention is the provision of scanning apparatus which can be used to read visual images from very large copy.

A further object of the present invention is the provision of scanning apparatus which can read small localized portions of a visual image.

It is another object of the instant invention to provide scanning apparatus having a reading head which can be used to read from copy supported with the visual image facing upwardly, so that the operator can easily select portions of the image to be transmitted.

A still further object of the invention is the provision of scanning apparatus having a reading head which is connected to the main scanner by a long flexible cable, thus permitting flexibility in reading.

It is a further object of the invention to provide scanning apparatus having a remote reading head which apparatus is simple in construction, rugged and dependable in operation, and is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the present invention consists of a scanning apparatus having a cable of optical fibers, having a reading head mounted on one end of the cable and adapted to reside adjacent a copy bearing a visual image, and having a scanner mounted on the other end of the cable for deriving an electrical signal representative of the said image. More specifically, the cable at each end is spread to form a line of individual fibers arranged in the same order at each end to derive a single scanning line from the image. The reading head is provided with a means to carry the end of the cable over the copy at a constant, pre-determined rate. This means includes a self-propelled carriage with illumination means for the portion of the image adjacent the end of the cable.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figures 1, 2:
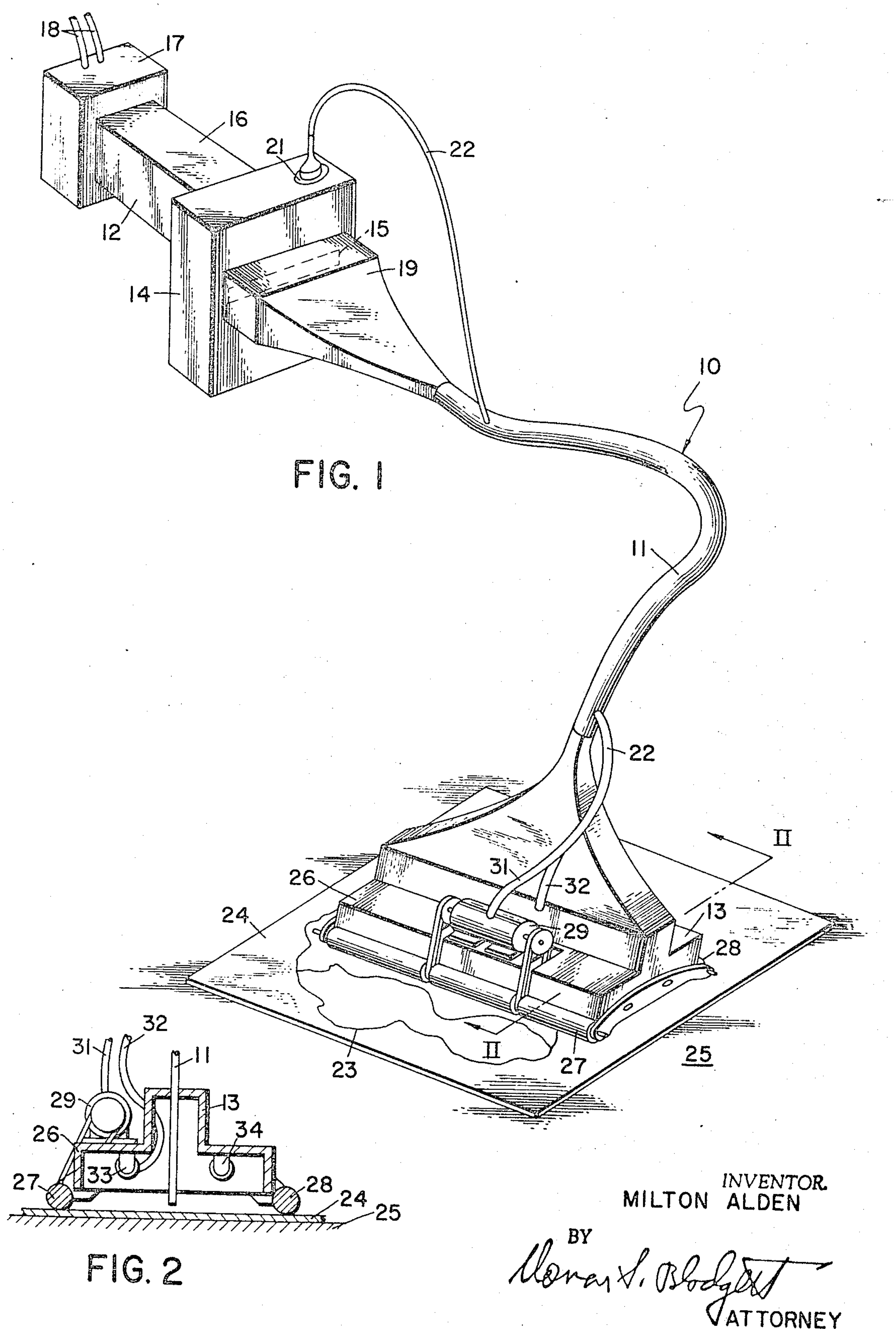
FIG. 1 is a perspective view of a scanning apparatus embodying the principles of the present invention.
FIG. 2 is a sectional view of the apparatus taken on the line II—II of FIG. 1.

Referring first to FIG. 1, wherein are best shown the general features of the invention, the scanning apparatus, indicated generally by the reference numeral 10, consists of a cable 11 of optical fibers having at one end a scanner 12 and at the other end a reading head 13. The cable 11 consists of a plurality of optical fibers, each fiber having the property of conducting the light by internal reflection, the fibers having a core of material which is transparent to the light and having a high index of refraction and being provided with a coating of a lower index of refraction than the said transparent core and of a thickness not exceeding a few microns for preventing the escape of the light from the fibers. In order to render the cable flexible, the core may consist of a material such as an acrylic plastic characterized by a high refractive index. The outer coating, which has a low index of refraction, may consist of a glass, such as a boron silicate or a thin layer of opaque material.

The scanner 12 is similar in nature to the device shown in the U.S. Pats. of Nyman Nos. 2,778,873 and 2,854,509, but with illuminating and copy-feeding equipment removed. The device, however, has a face 14 formed with a reading slot 15. Extending rearwardly from this slot is a light-transmitting tube 16 having at its other end an optical housing 17. This housing contains the usual elements, including collecting lens followed by a fixed slot behind which lies a rotary helical slot for scanning from side-to-side of the slot, and mirrors for projecting the light passing through the two slots onto a photocell. The photocell generates an electrical voltage in proportion to the intensity of the light falling upon it at any given time, and this signal is carried out to the conventional amplifying and transmitting apparatus through two wires 18.

Mounted on the front face 14 of the scanner and overlying the slot 15 is a housing 19. Within the housing the fibers forming the cable 11 are spread and fanned out to form a row of individual optical fibers arranged side-by-side along the centerline of the slot 15. Located on the scanner 12 is an electrical outlet 21 which is plugged into one end of a power cable 22. This cable joins the cable 11 and the two are bound together for most of their lengths.

The reading head 13 is mounted on the other end of the cable 11 for deriving an electrical signal representative of the image 23 on a copy 24 resting on a solid surface 25. The reading head is provided with means to carry the end of the cable over the copy at a constant, pre-determined rate, this means including a self-propelled carriage 26 having rolls 27 and 28 which support and drive it.

The roller 27 is driven at slow speed by a motor 29 which will include a speed reduction unit and which receives its power through the branch 31 of the power cable 22. Another branch 32 is connected to illuminating means, such as lamps 33 and 34, mounted inside the carriage and directed down toward the image 23 in the area where reading is to take place. The individual fibers of the cable 11 are spread out in fan fashion to form a single row of individual fibers similar to the row presented on the centerline of the slot 15 of the scanner 12. The order and arrangement of the individual fibers at the carriage 26 is the same as the order in which they are arranged in the housing 19.

The operation of the invention will now be readily understood, in view of the above description. The motor 29 is energized and rotates, preferably at a very slow speed, by virtue of the speed reduction unit, to drive the roller 27. This causes the carriage 26 to move over the surface of the copy 24 and to present successive lines of the image 23 to the ends of the individual optical fibers in the cable 11. The portion of the copy adjacent the ends of the cable is well illuminated by the lamps 33 and 34, which also receive their energy from the power cable 22. At any given time, a line of the image is presented through the various fibers of the cable, passes through the cable, and the light emerges from the other ends of the fibers in front of the slot 15. The light passing through any given fiber depends on the amount of reflection of the surface of the copy 24 and this, in turn, is indicative of the nature of the image 23. This line of reading passes the reading slot 15 and the light tube 16 of the scanner 12 and is picked up by the photocell, so that an electrical current passes through the wires 18 to be transmitted ultimately to a recorder at a remote location.

Because of the flexiblity of the cable 11, it is possible to place the head 13 on almost any surface, which surface may be extremely remote, if necessary, from the scanner 12. Furthermore, the particular portion of the image 23 that it is desired to read can be immediately picked up, particularly if the signal from the wires 18 is monitored on a local recorder, so that the operator can see exactly what the reading head is picking up at any given time. The reading head 13 is very light and easily moved, while the scanner 12 has the heavy elements of the system.

In a modified version of the invention, the reading head can be made even lighter; first of all, by placing the illuminating means in the scanner 12 and carrying the light through a portion of the fibers in the bundle 11. These fibers direct the light to the copy 24 adjacent the ends of the light-returning fibers. This obviates the need for somewhat heavy lamps 33 and 34 within the carriage. At the same time, also, instead of bringing electricity through the power cable 22, the motor can be mounted on the body of the scanner 12 and the driving motion carried through a flexible drive shaft of the well-known type which is bound together with the cable 11 in the same manner as the power line 22 in the preferred embodiment. This removes the need for the motor 29 and, possibly, gear reduction equipment, and makes the reading head even lighter.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A scanning apparatus, comprising:

a. a cable of optical fibers, the cable at each end being spread to form a line of individual fibers arranged in the same order at each end to derive a single scanning line from a copy bearing a visual image, b. a self-propelled carriage holding one end of the cable adjacent the said copy, c. a first elongated supporting roller mounted in the carriage and resting on the copy with its axis of rotation parallel to and spaced from the said line of fibers, d. a motor mounted on the carriage and connected to the roller for driving the same, e. a second elongated supporting roller mounted in the carriage and resting on the copy with its axis of rotation parallel to and spaced from the said line on the opposite side thereof from the first roller, the two rollers serving to smooth the copy in the neighborhood of the line, f. a pair of illuminating means mounted in the carriage adjacent the copy, on opposed sides of the one end, and spaced from the copy a greater distance than the one end, g. a scanner to which the other end of the cable is attached for deriving an electrical signal representative of the said visual image, and h. an electrical cable extending along and fixed to the optical fiber cable from the scanner to the carriage to supply power to the motor and the illuminating means.

* * * * *